United States Patent

Mahn, Jr. et al.

Patent Number: 5,833,788
Date of Patent: Nov. 10, 1998

[54] METHOD OF MARKING SBR AND NATURAL RUBBER PRODUCTS AND PRODUCTS

[75] Inventors: John Mahn, Jr., Cincinnati; John Mahn, Sr., Hamilton, both of Ohio

[73] Assignee: Specialty Adhesive Film Co., Cleves, Ohio

[21] Appl. No.: 946,763

[22] Filed: Oct. 8, 1997

Related U.S. Application Data

[62] Division of Ser. No. 412,723, Mar. 29, 1995, Pat. No. 5,736,472.

[51] Int. Cl.⁶ ........................................ B32B 31/00
[52] U.S. Cl. ..................... 156/209; 156/298; 156/299; 156/307.7; 156/308.2; 156/309.6
[58] Field of Search ................ 156/116, 307.7, 156/308.2, 309.6, 299, 298, 209

[56] References Cited

U.S. PATENT DOCUMENTS

| | | |
|---|---|---|
| 4,311,181 | 1/1982 | Hausch ............................. 428/79 |
| 5,010,122 | 4/1991 | Koski . |
| 5,145,617 | 9/1992 | Hermanson et al. . |
| 5,157,082 | 10/1992 | Johnson . |
| 5,229,201 | 7/1993 | Blanco . |
| 5,346,731 | 9/1994 | Nakanishi . |

*Primary Examiner*—James J. Bell
*Attorney, Agent, or Firm*—Wood, Herron & Evans, LLP

[57] ABSTRACT

SBR and natural rubber articles which can be marked with indicia are formed by curing the SBR or natural rubber under heat and pressure in contact with a fabric material. The curing conditions force the fabric into the cured rubber article. The fabric can then be marked with a heat-activated, indicia-bearing transfer. This provides for unique decoration of articles such as mud flaps and the like, and also permits providing identification for other rubber articles such as tires and the like.

9 Claims, 1 Drawing Sheet

METHOD OF MARKING SBR AND NATURAL RUBBER PRODUCTS AND PRODUCTS

This application is a divisional of application Ser. No. 08/412,723, filed Mar. 29, 1995 now U.S. Pat. No. 5,736,472.

BACKGROUND OF THE INVENTION

SBR or styrene butadiene rubber, as well as natural rubber, which is 1,4-polyisoprene, are used to produce a number of different articles. These articles can include tires, wheels and the like, and much simpler articles such as mud flaps, also referred to as splash guards, for trucks. Frequently, it is desirable to mark these articles with indicia. This presents a number of different problems. The indicia must remain affixed to the article over a wide variety of temperatures and other conditions. Further, they must be resistant to abrasion or they will be easily removed. In the past, it has been very difficult to mark these articles with indicia acceptable in the industry.

Currently, SBR mud flaps which have indicia are screen printed after cure. Generally, these are embossed when cured. The embossed areas are then manually painted with a solvent-based paint to make the embossed areas contrast and thus provide the indicia. This is suitable in some applications, but is unsuitable for providing individual indicia for the mud flaps. A specially marked die is required to emboss these mud flaps. Anytime the indicia is changed, the die must be changed or a new die used. This is extremely expensive. Further, with articles such as tires, it is frequently undesirable to have embossment.

Unfortunately, with polyisoprene or natural rubber and SBR rubber, it is very difficult to adhere indicia to the product. Many articles such as clothing can be marked using indicia coated with a thermoplastic adhesive. But with SBR and natural rubbers, due to their glossy finish as well as their chemical composition, it has not been possible to mark these with a thermoplastic adhesive or even a thermoset adhesive after they were cured. Although some such items adhere, they do not withstand abrasive forces encountered by tires and mud flaps. The paints used mark the item are not adequately resistant to abrasive forces.

Marking such items prior to cure creates a problem. The cure itself is conducted at elevated temperatures under pressure. During the cure, the rubber flows. Any thermoplastic material affixed to it, in turn, flows providing an unacceptable appearance.

SUMMARY OF THE INVENTION

Accordingly, it is an object of the present invention to provide a method to mark SBR and natural rubber surfaces. Further, it is an object of the present invention to provide such a method which can be easily modified to permit various indicia to be applied to the substrate.

In particular, the present invention is particularly suited for providing unique indicia on SBR as well as natural rubber mud flaps and tires.

According to the present invention, an outer surface of the natural rubber or SBR product is at least partially covered with a fabric material prior to cure. The product is then cured under pressure with this fabric material in place, forcing the material into the surface of the rubber article. The cure of the rubber physically bonds the fabric to the product, leaving the surface of the fabric exposed. This exposed surface can then be marked with indicia using various thermoplastic products and permitting the rubber article to be easily and uniquely marked without incurring significant expense. At the same time, the indicia is strongly adhered to the product and can withstand high and low temperatures as well as abrasive forces.

Further, the cloth layer can be laminated to a thermoplastic layer such as a thermoplastic elastomer. The cloth is bonded to the rubber product during cure with the thermoplastic separated from the rubber by the cloth layer. The cloth will keep the thermoplastic from flowing during cure. The thermoplastic, in turn, can provide a colored surface and can provide a surface to which latex and other materials will adhere.

The objects and advantages of the present invention will be further appreciated in light of the following detailed description and drawings in which:

DETAILED DESCRIPTION

The present invention provides a rubber article which is marked with some type of indicia such as lettering, logos, bar codes or any other symbol. For use in the present invention, "rubber" refers to only two types of rubber: SBR rubber or styrene butadiene rubber, and natural rubber, also referred to a 1,4-polyisoprene. These rubbers can be used to form a variety of different products. These would include tires, rubber mats, rubber hoses and belts and, in particular, mud flaps, for which the present invention is uniquely suited.

Although the present invention is described with particular reference to mud flaps, the invention per se is not limited to mud flaps, but could be used to mark virtually any vulcanized SBR or natural rubber product or blended compound. This is particularly beneficial with mud flaps which can be 0.25 to 0.7 inches thick.

Figure 1:
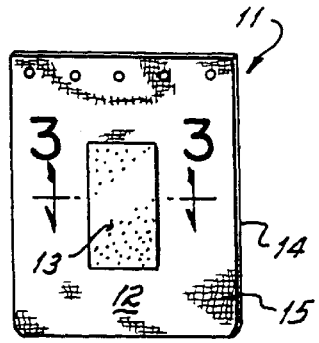
FIG. 1 is a perspective view of a mud flap for use in the present invention.
Figure 3:
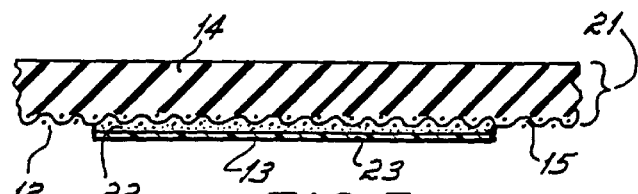
FIG. 3 is a cross-sectional view taken at lines 3—3 of FIG. 1.

As shown in FIG. 1, there is a mud flap 11 which includes a top surface 12 and indicia 13. As shown in FIG. 3, the mud flap includes a lower portion 14 which is formed from cured SBR or natural rubber. Embedded into portion 14 is a fabric material or layer 15, and in turn the indicia 13 is adhered to fabric layer 15 by an adhesive 22.

As previously indicated, the rubber body portion 14 is a cured SBR or natural rubber. This can be formed from a combination of fillers and natural rubber and/or SBR, along with curing agents, processing aids and the like, as is well known. Some of the filler can be reclaimed, cured, scrap rubber particles, as well as flashing from other molding processes. One particular material which is typically used is "friction" which is a commercially available SBR product which includes ground-up, scrap and/or cured rubber and uncured SBR rubber. Of course, natural rubber can be used and it is a matter of cost as to which is preferred. The exact formulation of the rubber portion is simply a matter of choice and these choices are well known to those skilled in the art.

A typical natural rubber formulation can include 100 parts natural rubber, 47.5 parts carbon black, 3 parts sulphur, 0.85 parts mercaptobenzothiazole, 5 parts zinc oxide and 3 parts stearic acid. Similar formulations can work with SBR by simply substituting SBR for the natural rubber. Peroxides can also be used for curing.

The cloth layer can be a woven or nonwoven fabric, preferably formed from a tight weave, and able to withstand curing temperatures and pressure. Typically, these rubbers are cured at about 260°–350° F. (preferably 310° F. ) at 70 to 800 psi or greater. One preferred material is a polyester broadcloth fabric which has a smooth woven surface on one side and a brushed surface on the other side. The brushed surface is designed to provide a fibrous side which can extend into the rubber 14. The weight of the fabric can be varied, depending upon the application. One suitable material has 85 ends, 62 picks and a weight of 8.80 oz per square yard. Various fabrics include adhesion promoters which can be beneficial. A suitable material can be purchased from Milliken.

Another material suitable for use in the present invention is a punched polyethylene fibrous web having a fabric weight of 12.5 oz per square yard. Cotton can also be used, as well as polyethylene, polypropylene, polyester, polyamides and blends. Again, the particular material employed can depend on aesthetics as well as cost. Even a relatively inexpensive cotton terry cloth or burlap can be used for practicing the present invention. Various weaves can be employed such as twill, satin, osnaberg and, of course, broadcloth. A tight weave is preferred. But if curing pressures are lowered, a looser weave can be employed.

Preferably, the cloth will be the same color as the rubber. This allows the cloth to blend in with the rubber.

As will be described hereinafter, the indicia can be a wide variety of indicia. Indicia 13, as shown in FIG. 3 includes an upper pigmented layer 23 and a lower adhesive layer 22 adhered to cloth surface 15. Basically, any adhesive indicia is suitable for use in the present invention so long as the adhesive is compatible with the fabric layer 15. Due to the variety of different fabric layers that can be employed, practically any thermoplastic heat activated transfer can be used for the present invention. Preferably, a heat activated indicia bearing transfer is employed. These employ a heat activated adhesive—either a thermoplastic adhesive or a heat activated thermoset adhesive. In particular, heat activated transfers which have a polyurethane adhesive lower layer are suitable for use in the present invention. Other suitable lower layers would include polyvinyl chloride adhesive, thermoplastic polyolefin, thermoplastic polyesters, as well as polyamides, EVA, and nitrile/PVC gum (which is a thermoplastic elastomer). Although less preferred, other types of adhesives such as moisture cure and air curing thermoset adhesives can be employed, as well as pressure sensitive adhesives.

Particular adhesives are disclosed in pending application Ser. No. 08/187,218, filed Jan. 27, 1994, entitled, "Heat Activated Applique With Upper Thermoplastic Elastomer Layer." The disclosure of this application is incorporated herein by reference.

Likewise, the upper indicia bearing layer can be a variety of different generally pigmented or contrasting layers. For example, thermoplastic elastomers, pigmented polyurethane, pigmented polyethylene, pigmented polyesters, as well as any pigmented film. For mud flaps, the pigmented layer is exposed to sun, weather, and the elements. Therefore, it needs to hold up. A preferred material is a thermoplastic elastomer formed from nitrile rubber and PVC.

Figure 2:
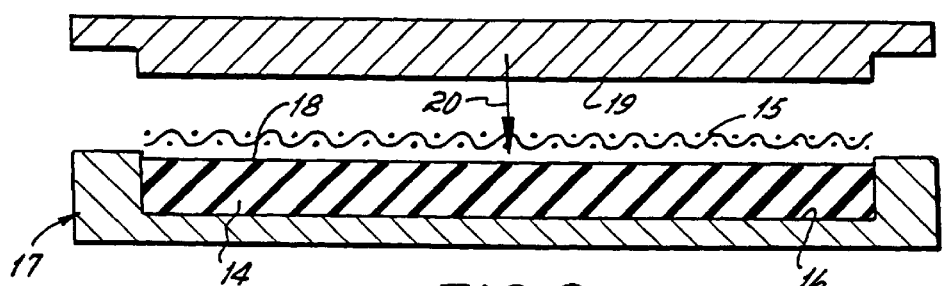
FIG. 2 is a diagrammatic depiction of the method of practicing the present invention.

The rubber article 14 with the embedded fabric layer 15 is formed, as shown in FIG. 2, using a compressive heat cure. The uncured SBR or natural rubber blended with a curing package is placed into a cavity 16 of a mold 17 leaving an exposed surface 18. The fabric material 15 is placed on top of this exposed surface 18 and a compressive surface 19 of mold 17 is forced down upon the cloth fabric 15, as indicated by arrow 20. Heat and pressure are applied effective to cure the SBR rubber or natural rubber. As previously indicated, the cure pressures run from 70 to 800 psi and temperatures of 260° to 350° F.

Once cured, the formed article 21 is removed from the mold and trimmed and subsequently can be marked with the previously-described indicia transfer 13. If transfer 13 is a heat activated transfer, this is bonded to article 21 by simply placing the heat activated transfer 13 with its thermoplastic or thermoactive adhesive side 22 against the cloth substrate 15, applying heat and pressure causing the adhesive layer 22 to melt and bond indicia layer 23 to layer 15 to in turn form the articles shown in FIG. 3.

Figure 4:
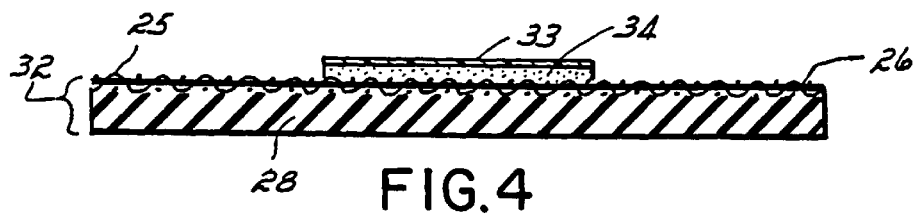
FIG. 4 is a cross-sectional view of an alternate embodiment of the present invention.
Figure 5:
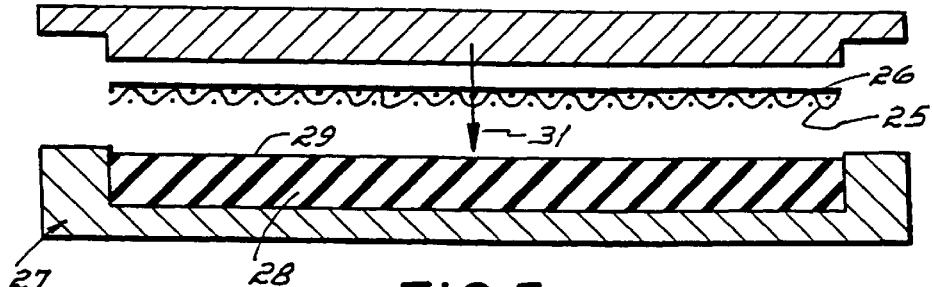
FIG. 5 is a diagrammatic depiction of an alternate method of practicing the present invention.

FIG. 4 shows an alternative embodiment of the present invention. In FIG. 4, the cloth layer 25 includes layer 26 of a thermoplastic film. This is formed by using a laminated fabric material in place of the simple fabric layer 15, as shown in FIG. 2. As shown in FIG. 5, in this particular application, a woven polyester fabric 25 laminated to a thermoplastic film 26 is bonded in a heated mold 27 to rubber layer 28.

The exposed surface 29 of the uncured rubber is covered with the laminated fabric 25 with the film 26 opposite the exposed rubber surface 29. The mold is closed, as indicated by arrow 31, and heat and pressure are then applied. This forces the polyurethane film 26 to melt and flow into the fabric 25, thus forming an article 32 having a rubber portion 28 with an embedded fabric layer 25. The film 26, in turn, acts to seal the surface, preventing materials in the rubber from leaching out. The fabric 25 is then marked with indicia 33 by using a thermoplastic adhesive layer 34, as previously described, bonding the indicia layer 33 to the cloth fabric 25. One such laminated fabric can be purchased from Milliken & Co. where the film is a polyurethane. Another suitable film which can be laminated to any suitable fabric layer is a thermoplastic elastomer such as a nitrile/PVC thermoplastic elastomer. This is not compatible with SBR rubber. Thus, when it flows into fabric 25 it acts as a barrier to the SBR rubber 28, keeping it from migrating through the fabric 25. A nitrile/PVC thermoplastic elastomer is sold by Goodyear Chemical under the brand name Chemigum TPE 02055. Others are disclosed in co-pending application Ser. No. 08/187,218, filed Jan. 27, 1994, the disclosure of which is incorporated herein by reference. If this film is the same color as the rubber article, the fabric layer is hidden by the thermoplastic film 26.

Figure 6:
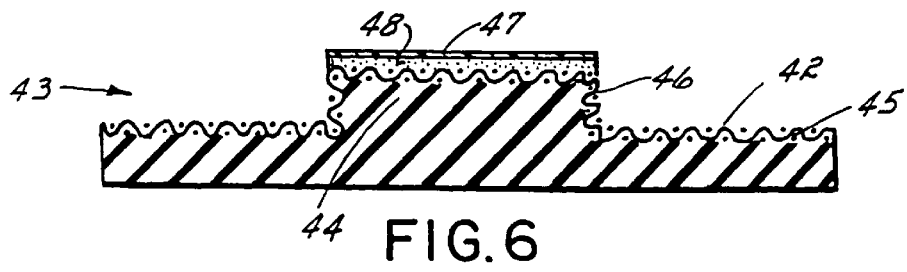
FIG. 6 is a cross-sectional view of a second alternate embodiment of the present invention.

Another alternate embodiment of the present invention is shown in FIG. 6. In this embodiment, the surface 42 of a mud flap 43 has an embossment 44. The mud flap is formed in the same manner as shown in FIG. 2 and FIG. 5. An embossment 44 is created simply by forming a debossed portion of a mold (not shown) which is forced down upon the cloth-covered surface during the molding process. This forces the rubber to flow up into the debossed area of the mold and likewise forces the fabric 45 to stretch and move in this direction. This provides a fabric coated embossed surface 46 which is then marked with indicia 47 using a thermoplastic adhesive layer 48.

According to a fourth alternate embodiment of the present invention, the indicia 13 can be applied to the fabric surface 15 during curing of the rubber article. The indicia 13 is simply placed on the fabric 15 with the thermoplastic layer 22 contacting the fabric layer 15. The mold 17 is closed and heat and pressure applied to cure the article. Although the pressure would tend to force the thermoplastic indicia to migrate during cure, since it adheres to the fabric 15 it maintains its dimensions during cure and thus can be employed to mark the fabric surface of the rubber article.

Finally, in a less preferred embodiment of the present invention, the fabric surface 15 can be replaced with a polymeric thermoplastic film. The preferred polymeric film is a thermoplastic elastomer. Such thermoplastic elastomers include natural rubber, polyethylene blends and butadiene rubber styrene blends. Preferred brands include Vyram sold by AES, Housmex SBR and Enichem SBS. This film will adhere to the rubber surface during cure. Unfortunately, since the cure conditions can cause the rubber material to migrate, this can cause the polymeric film to flow, providing a mottled appearance. But the mottled polymeric film adheres strongly to the rubber surface, providing a surface, like fabric surface 15, to which thermoplastic indicia can adhere. The indicia is thus thermoplastically adhered to the mottled polymeric surface. As such, this provides an alternate method of marking the cured SBR and natural surfaces in the event such an appearance is aesthetically acceptable.

The present invention can be used to mark rubber tires by simply embedding a small piece of a fabric into the exterior surface of the tire wall before it is cured. The curing will embed the fabric into the surface of the tire. This fabric can then be marked with indicia, as previously described.

This invention is particularly suitable for making mud flaps and in particular for use in making custom designed mud flaps since the indicia can be easily cut and formed to the desired size without the need to create a new die. The mud flap can be individually marked without the need to create the die and at a relatively low cost. This invention can also be used with conventional embossed mud flaps, as well as with a wide variety of other applications.

This has been a description of the present invention, along with a preferred method of practicing the present invention. However, the invention should be defined only by the appended claims wherein we claim:

1. A method of forming and marking a rubber article, said article comprising rubber selected from the group consisting of SBR rubber and natural rubber;

covering an exposed surface of uncured rubber with a fabric material;

applying heat and pressure onto said fabric and said uncured rubber to cause said rubber to cure, thereby partially embedding said fabric into said rubber;

adhering a transfer providing indicia onto said fabric to bond said indicia to said rubber article.

2. The method claimed in claim 1 wherein transfer is a heat activated adhesive adhered to said fabric.

3. The method claimed in claim 2 wherein said fabric comprises a polyester.

4. The method claimed in claim 1 wherein said rubber article surface is embossed.

5. The method claimed in claim 1 wherein said fabric has a first and second fabric surface, a thermoplastic polymeric coating on said first surface, and wherein said second fabric surface is applied against said exposed surface of said uncured rubber.

6. The method claimed in claim 1 wherein said article is a mud flap.

7. The method claimed in claim 1 wherein said article is a tire.

8. A method of marking a cured rubber article wherein said rubber is selected from the group consisting of natural rubber and SBR rubber, said method comprising covering an exposed surface of uncured rubber with a thermoplastic polymeric film, applying heat and pressure onto said polymeric film and said uncured rubber to cure and bonding said polymeric film to said rubber; applying a heat activated indicia-bearing transfer onto said polymeric film to bond said indicia to said rubber article.

9. The method claimed in claim 8 wherein said thermoplastic film is a thermoplastic elastomer.

* * * * *